(12) United States Patent
Lee

(10) Patent No.: US 11,185,976 B2
(45) Date of Patent: Nov. 30, 2021

(54) SYSTEM FOR AUTOMATIC WHEEL ALIGNMENT ADJUSTMENT

(71) Applicants: Kia Motors Corporation, Seoul (KR); Hyundai Motor Company, Seoul (KR)

(72) Inventor: Yongcheol Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 11 days.

(21) Appl. No.: 16/846,531

(22) Filed: Apr. 13, 2020

(65) Prior Publication Data

US 2021/0094169 A1 Apr. 1, 2021

(30) Foreign Application Priority Data

Sep. 30, 2019 (KR) .......................... 10-2019-0120373

(51) Int. Cl.
  *B25J 9/00* (2006.01)
  *B60S 5/00* (2006.01)
  (Continued)

(52) U.S. Cl.
  CPC ............. *B25J 9/0084* (2013.01); *B23P 19/10* (2013.01); *B25J 11/005* (2013.01); *B60S 5/00* (2013.01); *B62D 65/005* (2013.01); *G01B 5/255* (2013.01); *B23P 2700/50* (2013.01); *B25J 5/02* (2013.01); *B25J 9/0093* (2013.01); *B25J 9/0096* (2013.01); *B25J 9/04* (2013.01); *B25J 9/1679* (2013.01); *B25J 11/008* (2013.01); *B25J 15/0019* (2013.01); *B25J 15/0038* (2013.01); *B62D 17/00* (2013.01)

(58) Field of Classification Search
  CPC . B25J 5/02; B25J 9/0084; B25J 9/0093; B25J 9/0096; B25J 9/04; B25J 9/1679; B25J 11/005; B25J 11/008; B25J 15/0019; B25J 15/0038; B23P 19/10; B23P 2700/50; B60S 5/00
  See application file for complete search history.

(56) References Cited

U.S. PATENT DOCUMENTS

| 5,027,275 A | * | 6/1991 | Sakamoto | ............. | G01M 17/06 |
| | | | | | 280/86.758 |
| 5,040,303 A | * | 8/1991 | Koerner | ................. | G01B 7/315 |
| | | | | | 33/286 |

(Continued)

*Primary Examiner* — Jermie E Cozart
(74) *Attorney, Agent, or Firm* — Slater Matsil, LLP

(57) ABSTRACT

A system for automatic wheel alignment adjustment of a vehicle in an inspection line is provided. The system is disposed under a mounting table mounted with a vehicle and includes a front wheel adjustment apparatus disposed in correspondence with a front wheel of the vehicle and configured to adjust alignment of the front wheel by adjusting a tie-rod and a lock-nut employed in a linkage structure of the front wheel, a rear wheel moving apparatus disposed in correspondence with a rear wheel of the vehicle and slidable in a vehicle width direction, and a rear wheel adjustment apparatus disposed in correspondence with the rear wheel of the vehicle, connectable to the rear wheel moving apparatus, and configured to adjust alignment of the rear wheel by adjusting a cam-bolt and a cam-nut employed in a linkage structure of the rear wheel.

17 Claims, 6 Drawing Sheets

(51) Int. Cl.
B23P 19/10 (2006.01)
B25J 11/00 (2006.01)
B62D 65/00 (2006.01)
G01B 5/255 (2006.01)
B62D 17/00 (2006.01)
B25J 15/00 (2006.01)
B25J 5/02 (2006.01)
B25J 9/16 (2006.01)
B25J 9/04 (2006.01)

(56) References Cited

U.S. PATENT DOCUMENTS

| | | | | |
|---|---|---|---|---|
| 6,308,593 | B1 * | 10/2001 | Shibayama | B25B 17/00 |
| | | | | 81/57.4 |
| 7,357,053 | B2 * | 4/2008 | Doan | G01B 5/255 |
| | | | | 81/57.14 |
| 8,082,822 | B2 * | 12/2011 | Hoenke | B25J 11/00 |
| | | | | 81/57.14 |
| 2006/0108131 | A1 * | 5/2006 | Osada | G01B 5/255 |
| | | | | 173/11 |

* cited by examiner

SYSTEM FOR AUTOMATIC WHEEL ALIGNMENT ADJUSTMENT

CROSS-REFERENCE TO RELATED APPLICATIONS

This application claims priority to Korean Patent Application No. 10-2019-0120373, filed in the Korean Intellectual Property Office on Sep. 30, 2019, which application is hereby incorporated herein by reference.

TECHNICAL FIELD

The present invention relates to a system for automatic wheel alignment adjustment.

BACKGROUND

All components that make up a suspension and steering system in a vehicle must be assembled correctly according to the design specifications of the vehicle, and an interlocking state of these components is the basis of wheel alignment.

The wheel alignment may affect a vehicle's dynamics in various driving circumstances, such as running in a straight line, cornering, braking, and accelerating.

The wheel alignment is composed of elements such as toe, camber, caster, and king pin inclination angle, and they complement each other to reduce the operating force of the steering wheel, provide stability of the steering wheel operation, provide straight line stability of the vehicle, contribute to the steering wheel resilience, and reduce tire wear.

In the related art, in order to adjust the wheel alignment of a vehicle of which production is completed, manual work is generally performed by an operator, but an automation system using an industrial robot to automate the alignment adjustment is under development.

Due to heavy tools used for the wheel alignment adjustment, a large robot having a high payload may be used, and thus the weight of the robot itself may be much more than 100 kg.

Such a heavy and large wheel alignment adjustment apparatus may be difficult to be replaced even if the robot breaks down, and the wheel alignment adjustment apparatus needs to be repaired while the robot is indisposed. In this case, the lack of space often leads to stopping the production line while the robot is being repaired.

The above information disclosed in this Background section is only for enhancement of understanding of the background of the invention and therefore it may contain information that does not form the prior art that is already known to a person of ordinary skill in the art.

SUMMARY

Embodiments of the present invention provide a system for automatic wheel alignment adjustment having advantages of preventing stoppage of a whole system of an inspection line due to malfunctioning of a partial apparatus.

An exemplary system for automatic wheel alignment adjustment of a vehicle in an inspection line is disposed under a mounting table mounted with a vehicle, and the exemplary system may include a front wheel adjustment apparatus, a rear wheel moving apparatus, and a rear wheel adjustment apparatus. The front wheel adjustment apparatus may be disposed in correspondence with a front wheel of the vehicle and configured to adjust alignment of the front wheel by adjusting a tie-rod and a lock-nut employed in a linkage structure of the front wheel.

The rear wheel moving apparatus may be disposed in correspondence with a rear wheel of the vehicle and slidable in a vehicle width direction.

The rear wheel adjustment apparatus may be disposed in correspondence with a rear wheel of the vehicle, connectable to the moving apparatus, and configured to adjust alignment of the rear wheel by adjusting a cam-bolt and a cam-nut employed in a linkage structure of the rear wheel.

The front wheel adjustment apparatus may include a pair of front robots mounted on a front table fixed to a ground and slidable along a vehicle length direction through a plurality of rails formed on an upper surface of the front table, a tie-rod gripper installed to the front robot and configured to adjust the tie-rod, and a lock-nut runner mounted to the front robot and configured to adjust the lock-nut.

Each of the pair of front robots may include a front carriage mounted on the plurality of rails and slidable in a vehicle length direction, a front moving part mounted on the front carriage, movable in the vehicle width direction along the front carriage, and configured to move in an up and down direction, and a front robot arm mounted at the front moving part.

The tie-rod gripper may include a body part mounted to an end of the front robot, a pair of moving brackets installed at the body part to reciprocally move to be closer or farther with respect to each other, and a pair of finger members fixedly installed at each of the moving brackets and formed with gripping grooves for gripping the tie-rod, at surfaces facing each other.

The moving bracket may be reciprocally movable.

The pair of finger members may reciprocally move with respect to each other according to movement of the pair of moving brackets to grip the tie-rod by the gripping grooves.

The lock-nut runner may be installed to the tie-rod gripper through a mounting bracket and is electrically operated.

The lock-nut runner may include a gripping part for gripping the lock-nut, the gripping part being in line with the finger member of the tie-rod gripper.

The lock-nut runner may be operable through wireless communication.

The rear wheel moving apparatus may include a pair of rear robots mounted on a rear table fixed to a ground and slidable along a vehicle width direction through a plurality of rails formed on an upper surface of the rear table, and a coupling part installed to the rear robot and being attachable to and detachable from the rear wheel adjustment apparatus.

Each of the pair of rear robots may include a rear carriage mounted on the plurality of rails and slidable in a vehicle width direction, a rear moving part mounted on the rear carriage, movable in the vehicle length direction along the rear carriage, and configured to move in an up and down direction, and a rear robot arm mounted at the rear moving part.

The rear moving part may be movable in an up and down direction.

The rear wheel adjustment apparatus may be operated by the rear moving part and the rear robot arm.

The coupling part may be attachable to and detachable from an engagement pin of the rear wheel adjustment apparatus.

The rear wheel adjustment apparatus may include a pair of actuating parts fixed to the center table through a pair of supporting stands and movable in an up and down direction, a linkage part connected to an end of a driving shaft of the actuating parts, and an electric power tool connected to an end of the linkage part and including a cam-nut runner and a cam-bolt gripper configured to adjust the cam-nut and the cam-bolt respectively, where a distance between the cam-nut runner and the cam-bolt gripper is adjustable.

The electric power tool may include a tool bracket connected to an end of the linkage part and formed with a slit groove along a length direction, wherein the cam-nut runner is installed at the slit groove, and the cam-bolt gripper is slidably fitted to the slit groove through a moving block, thereby the distance between the cam-nut runner and the cam-bolt gripper becomes adjustable.

The distance between the cam-nut runner and the cam-bolt gripper of the electric power tool is in a range of 60 mm to 88 mm.

According to a system for automatic wheel alignment adjustment according to an exemplary embodiment, when a component apparatus malfunctions, e.g., when any of the front wheel adjustment apparatus, rear wheel moving apparatus, and the rear wheel adjustment apparatus malfunctions, the malfunctioning apparatus may be moved from the working space of alignment adjustment to a new space and may be serviced in the new space place. Therefore, a correctly functioning apparatus may continue its alignment adjustment, and stoppage of a whole system due to malfunctioning of a partial apparatus may be prevented.

Further, effects that can be obtained or expected from exemplary embodiments of the present invention are directly or suggestively described in the following detailed description. That is, various effects expected from exemplary embodiments of the present invention will be described in the following detailed description.

DETAILED DESCRIPTION OF ILLUSTRATIVE EMBODIMENTS

Figure 1:
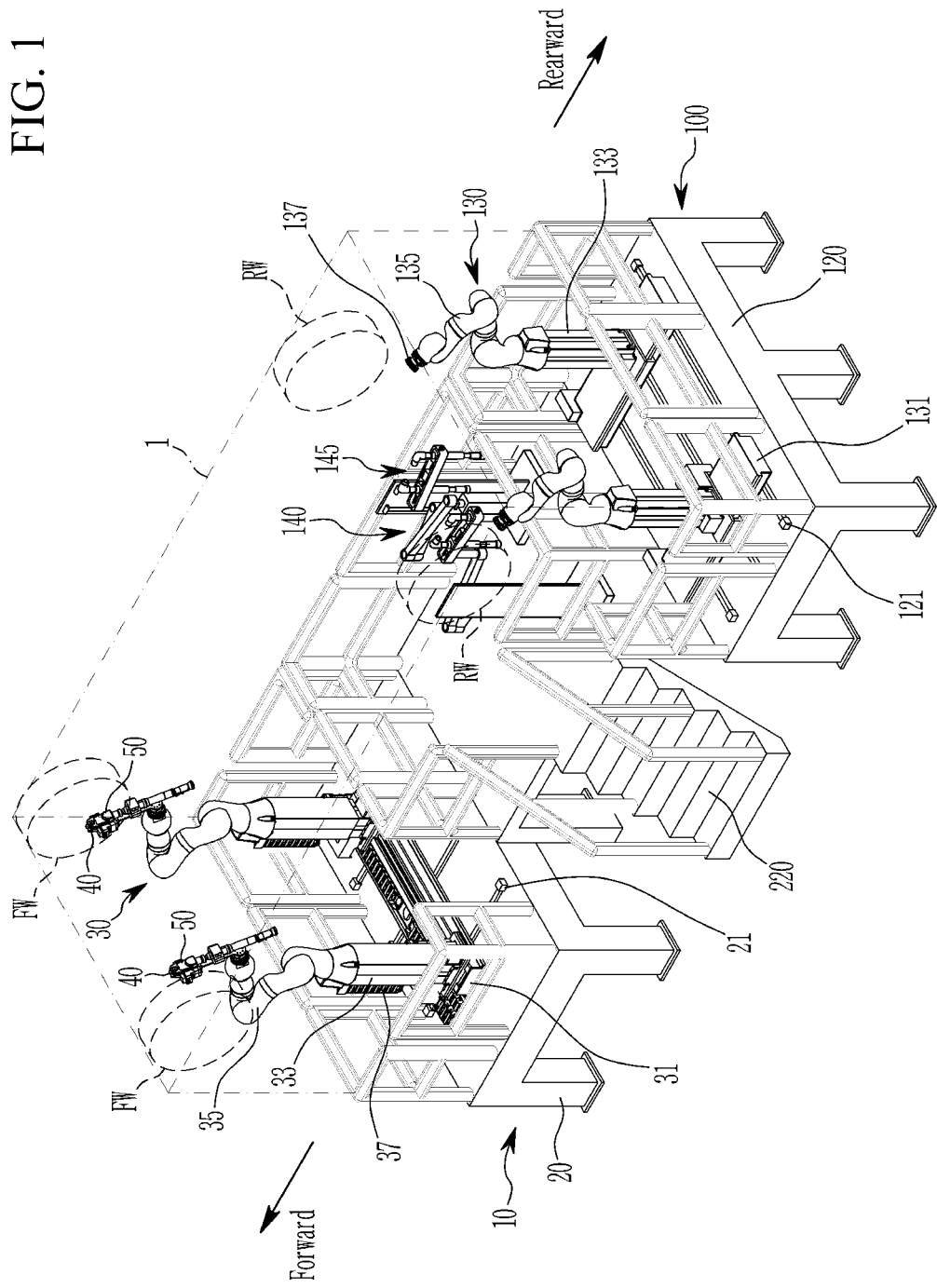
FIG. 1 is a schematic diagram of a system for automatic wheel alignment adjustment according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 2:
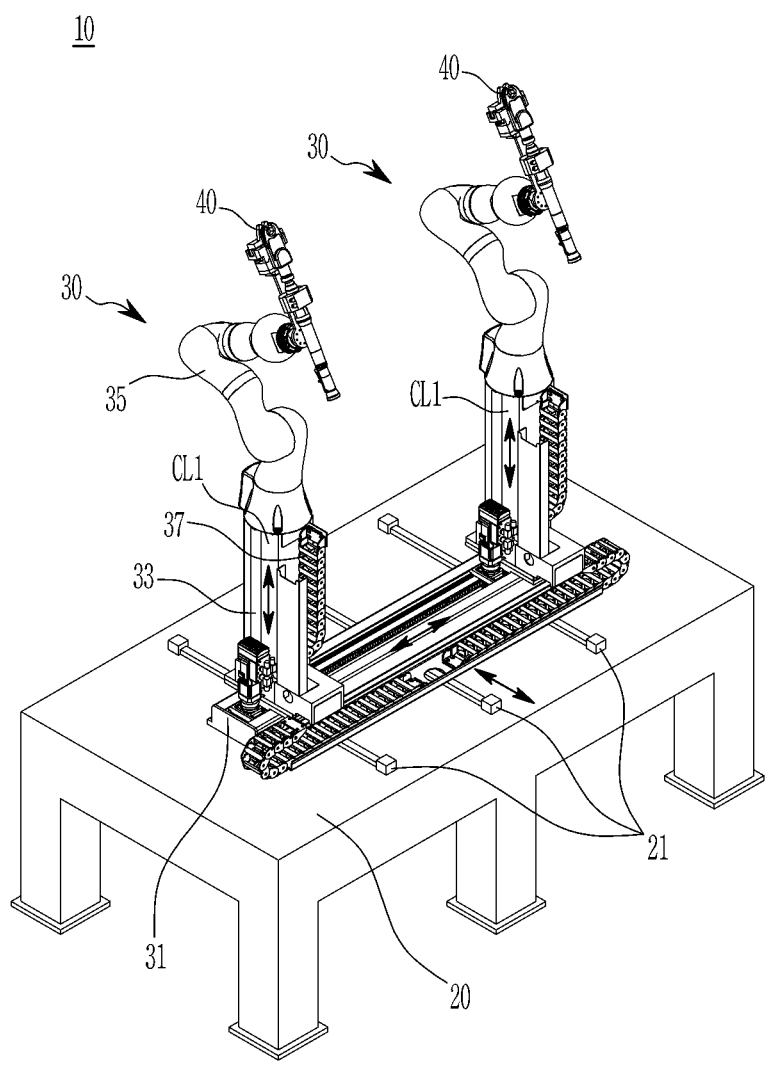
FIG. 2 is a schematic diagram of a front wheel adjustment apparatus applied to a system for automatic wheel alignment adjustment according to an exemplary embodiment.
Figure 3:
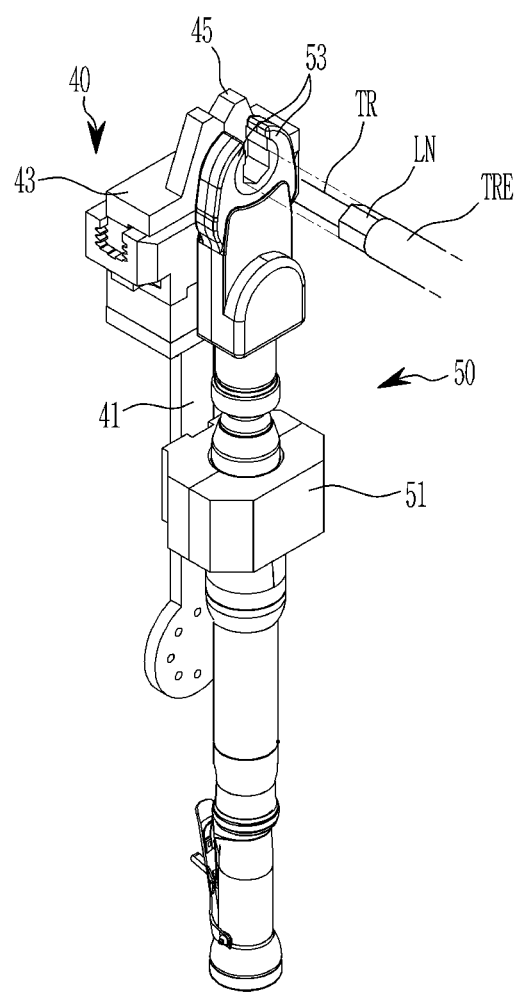
FIG. 3 and FIG. 4 are enlarged views of a front wheel adjustment apparatus applied to a system for automatic wheel alignment adjustment according to an exemplary embodiment.
Figure 4:
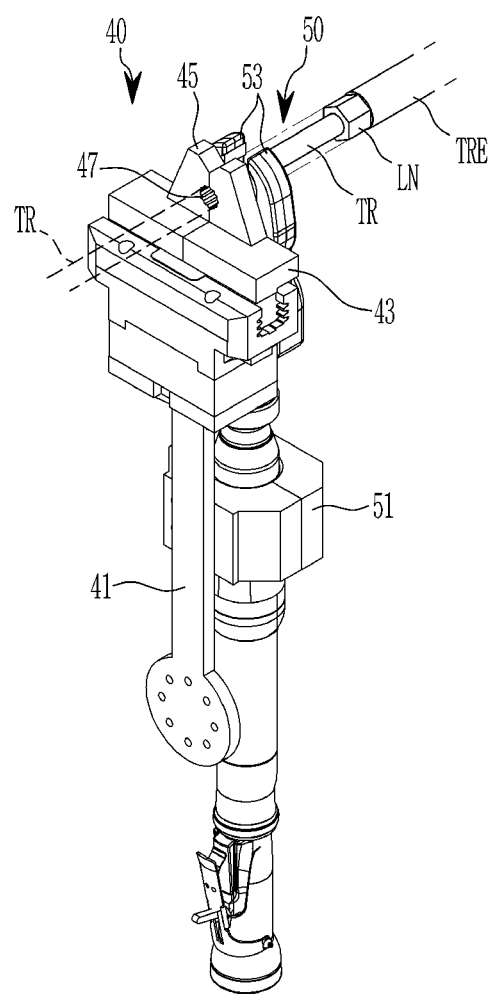
Figure 5:
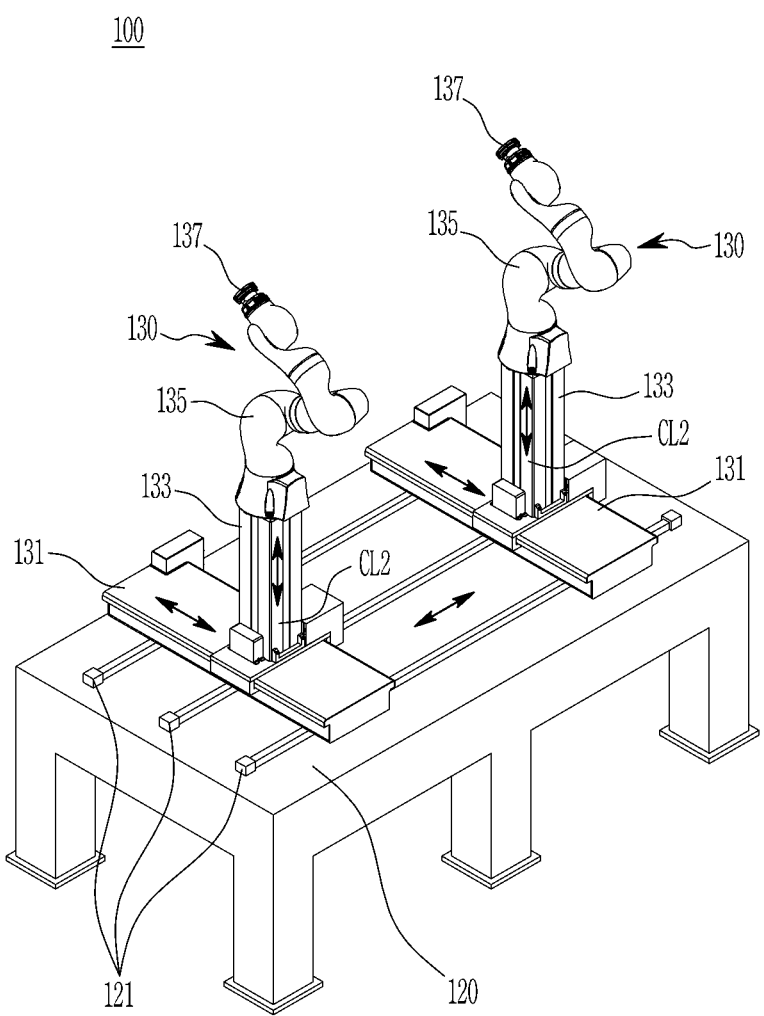
FIG. 5 is a schematic diagram of a rear wheel moving apparatus applied to a system for automatic wheel alignment adjustment according to an exemplary embodiment.
Figure 6:
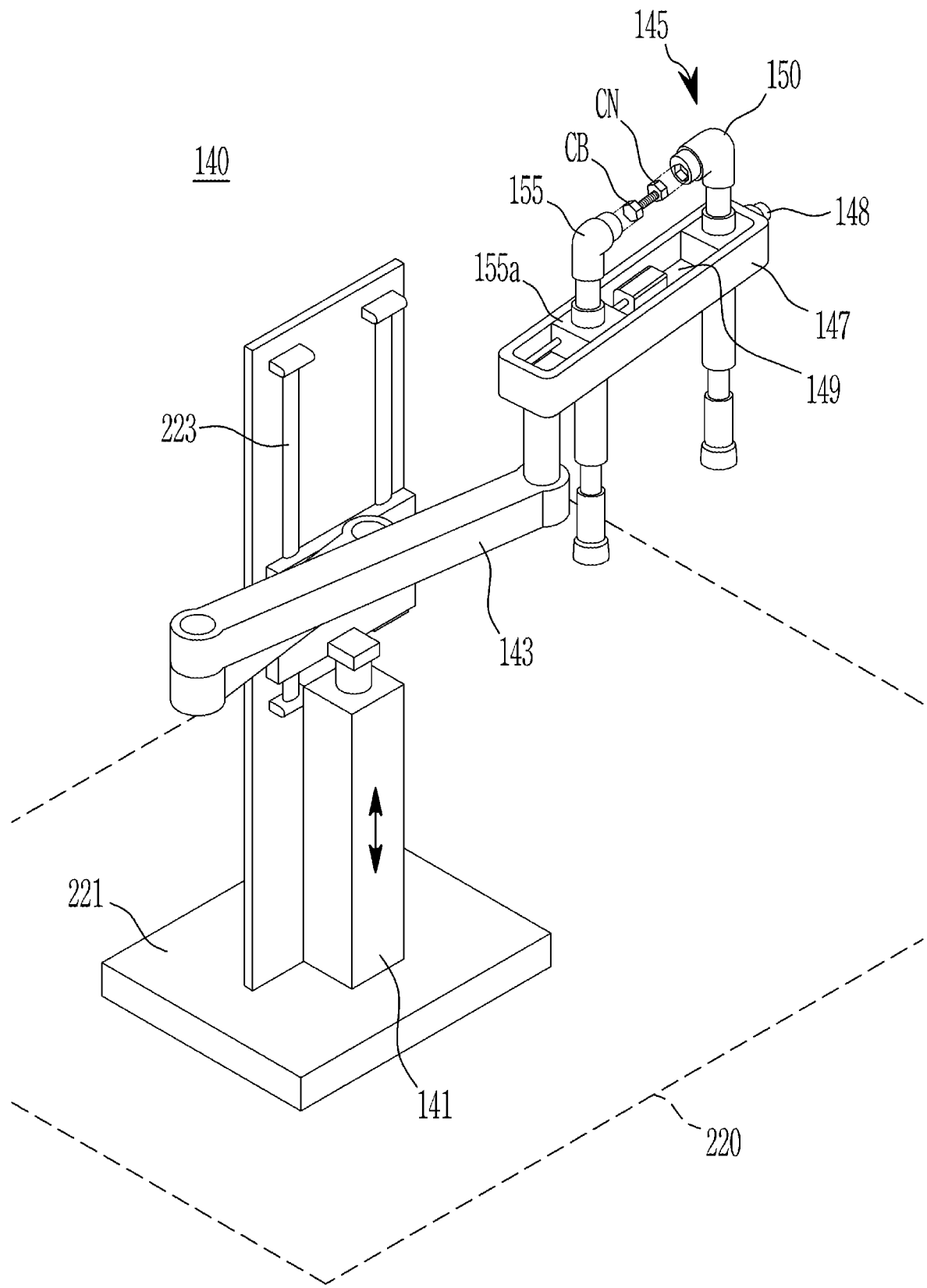
FIG. 6 is a schematic diagram of a rear wheel adjustment apparatus applied to a system for automatic wheel alignment adjustment according to an exemplary embodiment.

FIG. 1 is a schematic diagram of a system for automatic wheel alignment adjustment according to an exemplary embodiment. FIG. 2 is a schematic diagram of a front wheel adjustment apparatus applied to a system for automatic wheel alignment adjustment according to an exemplary embodiment. FIG. 3 and FIG. 4 are enlarged views of a front wheel adjustment apparatus applied to a system for automatic wheel alignment adjustment according to an exemplary embodiment. FIG. 5 is a schematic diagram of a rear wheel moving apparatus applied to a system for automatic wheel alignment adjustment according to an exemplary embodiment. FIG. 6 is a schematic diagram of a rear wheel adjustment apparatus applied to a system for automatic wheel alignment adjustment according to an exemplary embodiment.

Referring to FIG. 1, a system for automatic wheel alignment adjustment according to an exemplary embodiment is applied to an inspection line of a manufacturing factory of a vehicle.

The vehicle is moved to a mounting table 1 along a movement rail (not shown) formed above the mounting table 1.

The movement rail may be formed along a length direction of the vehicle, and the vehicle may move on the movement rail, for example, by its own wheels.

The system for automatic wheel alignment adjustment is arranged below the mounting table 1 where the vehicle is mounted, and when the vehicle is disposed on the mounting table 1, the system initiates a wheel alignment adjustment.

At this time the system for automatic wheel alignment adjustment may recognize identification information, e.g., a vehicle identification number (VIN), for identifying the vehicle.

The system for automatic wheel alignment adjustment measures a toe-in value (hereinafter, referred to as a "toe value") and camber value, with respect to front and rear wheels. As is well-known in the art, the toe value is a value by which a front end of the wheel is biased inward in comparison with a rear end of the wheel, and the camber value is a value by which a top end of the wheel is biased outward in comparison with a bottom end of the wheel.

The system for automatic wheel alignment adjustment according to an exemplary embodiment compares the measured toe and camber values with predetermined toe and camber values, and adjusts alignments of front and rear wheels to compensate the error.

For the alignment adjustment of the front wheels, engagement of a tie-rod and a lock-nut may be adjusted, and for the alignment adjustment of the rear wheels, a cam-bolt and a cam-nut employed in a linkage structure may be adjusted.

A system for automatic wheel alignment adjustment according to an exemplary embodiment includes a front wheel adjustment apparatus 10, a rear wheel moving apparatus 100, and a rear wheel adjustment apparatus 140.

The front wheel adjustment apparatus 10 is disposed in a basement space below the mounting table 1, in correspondence with the front wheel FW of the vehicle.

Referring to FIG. 2, the front wheel adjustment apparatus 10 includes a front table 20, a pair of front robots 30, a tie-rod gripper 40, and a lock-nut runner 50.

The front table 20 is disposed below the mounting table 1, and is fixed to the ground in correspondence with the front wheel FW.

A plurality of rails 21 are formed on an upper surface of the front table 20.

The plurality of rails 21 may be formed along a vehicle length direction on the upper surface of the front table 20 to be spaced apart at predetermined intervals in a vehicle width direction.

A pair of front robots 30 is mounted on the plurality of rails 21, where the front robots 30 are small robots, and are installed to be slidably moved in the vehicle length direction through the rails 21.

Each of the front robots 30 is mounted on a front carriage 31 fitted to the plurality of rails 21.

The front carriage 31 may be provided with a cable guider 37 for organizing various cables.

The front carriage 31 is equipped with a pair of front moving parts 33, and each of the front moving parts 33 is mounted on the front carriage 31 so as to be movable in the vehicle width direction along the front carriage 31.

It has been described above that the front carriage 31 is fitted to a plurality of rails 21 formed on the upper surface of the front table 20 and is movable in the vehicle length direction, and that the front moving parts 33 are connected to the front carriage 31 to be movable in the vehicle width direction. However, it may be understood that it is not necessarily limited thereto. The arrangement direction of the rail 21 on the front table 20 may be changed so that directions of movement of the front carriage 31 and the front moving parts 33 may be interchanged.

That is, the moving directions of the front carriage 31 and the front moving parts 33 may be configured to move in any combination of the vehicle width direction or the vehicle length direction.

In addition, the pair of front moving parts 33 is configured to move in up and down directions while moving in the vehicle length direction along the front carriage 31.

The front moving parts 33 are configured to move in the up and down direction, e.g., by an operation of a cylinder CIA.

The cylinder CIA may be operated, for example, hydraulically or pneumatically.

In addition, a front robot arm 35 is mounted at respective front moving parts 33.

The front robot arm 35 may be made of multiple joints to facilitate position control.

A tie-rod gripper 40 for adjusting the tie-rod TR is mounted at an end of each front robot arm 35.

The tie-rod gripper 40 may be configured to operate pneumatically.

Referring to FIG. 3, the tie-rod gripper 40 includes a body part 41, a pair of moving brackets 43, and a finger member 45.

The body part 41 is mounted to an end of the front robot arm 35.

In addition, the pair of moving brackets 43 is installed at the body part to reciprocally move to be closer or farther with respect to each other.

The pair of moving brackets 43 is installed to reciprocate relative to the body part 41, e.g., by a cylinder operation.

Referring to FIG. 4, a pair of finger members 45 is fixedly installed at each of the moving brackets 43, and each finger member 45 is formed with a gripping groove 47 for gripping the tie-rod TR, at surfaces facing each other.

Thus, each finger member 45 is configured to reciprocally move according to the operation of the moving bracket 43, and thereby to grip the tie-rod TR through the gripping groove 47.

A lock-nut runner 50 is mounted to the tie-rod gripper 40. The lock-nut runner 50 is mounted to the body part 41 of the tie-rod gripper 40 through a mounting bracket 51.

The lock-nut runner 50 includes a gripping part 53 for gripping the lock-nut LN, which locks the position of the tie-rod to a tie-rod end TRE. The lock-nut runner 50 may be aligned with the gripping part 53 since a tie-rod and a lock-nut of a steering system of a vehicle are typically designed to be aligned with each other.

The lock-nut runner 50 may be configured to be operable through wireless communication.

Alternatively, the lock-nut runner 50 may be configured to be electrically operated by being connected by wire.

Thus, the lock-nut runner 50 is configured to move with the tie-rod gripper 40 to adjust the lock-nut LN connected to the linkage structure of the front wheel FW.

That is, the tie-rod gripper 40 and the lock-nut runner 50 are configured to be movable by the front robot in response to the tie-rod TR and the lock-nut LN of the vehicle.

Referring to FIG. 5, the rear wheel moving apparatus 100 is disposed in correspondence with the rear wheel RW of the vehicle.

The rear wheel moving apparatus 100 is installed to be slidably movable in the vehicle width direction, and includes a rear table 120, a pair of rear robots 130, and a coupling part 137.

The rear table 120 is disposed below the mounting table 1, and is fixed to the ground in correspondence with the rear wheel RW.

A plurality of rails 121 is formed on an upper surface of the rear table 120.

The plurality of rails 121 may be formed along the vehicle width direction on the upper surface of the rear table 120 to be spaced apart at predetermined intervals in the vehicle length direction.

A pair of rear robots 130 is mounted on the plurality of rails 121, where the rear robots 130 are small robots, and are installed to be slidably moved in the vehicle width direction through the rails 121.

The rear robots 130 are mounted on a rear carriage 131 fitted to the plurality of rails 121, and the rear carriage 131 is slidably movable in the vehicle width direction along the rails 121.

The rear carriage 131 is equipped with a pair of rear moving parts 133, and the rear moving parts 133 are mounted on the rear carriage 131 so as to be movable in the vehicle length direction along the rear carriage 131.

It has been described above that the rear carriage 131 is fitted to the plurality of rails 121 formed on the upper surface of the rear table 120 and is movable in the vehicle width direction, and that the rear moving parts 133 are fitted to the rear carriage 131. However, it may be understood that it is not necessarily limited thereto. The arrangement direction of the rails 121 on the rear table 120 may be changed so that directions of movement of the rear carriage 131 and the rear moving parts 133 may be interchanged.

That is, the moving direction of the rear carriage 131 and the rear moving parts 133 may be configured to move in any combination of the vehicle width direction or the vehicle length direction.

In addition, the pair of rear moving parts 133 is configured to move in up and down directions while moving in the vehicle length direction along the rear carriage 131.

The rear moving parts 133 are configured to move in the up and down direction, e.g., by an operation of a cylinder CL2.

The cylinder CL2 may be operated, for example, hydraulically or pneumatically.

In addition, a rear robot arm 135 is mounted at a respective rear moving part 133.

The rear robot arm 135 may be made of multiple joints to facilitate position control.

A coupling part 137 is mounted at an end of the rear robot arm 135. The coupling part 137 is configured to be coupled to and decoupled from the rear wheel adjustment apparatus 140. That is, the coupling part 137 is attachable to and detachable from the rear wheel adjustment apparatus 140.

In other words, the coupling part 137 is configured to be coupled to and decoupled from a coupling pin 148 formed on a tool bracket 147 of the rear wheel adjustment apparatus 140 to be described later.

The coupling part 137 may be configured to be coupled to and decoupled from the coupling pin 148 through an operation of an air cylinder or a hydraulic cylinder.

Therefore, the rear wheel adjustment apparatus 140 may be operated, e.g., moved or tilted, by the rear moving part 133 and the rear robot arm 135 by being coupled through the coupling part 137.

Referring to FIG. 6, the rear wheel adjustment apparatus 140 may be coupled to the rear wheel moving apparatus wo through the coupling pin 148, to adjust the cam-bolt and the cam-nut employed in the linkage structure of the rear wheel RW.

The rear wheel adjustment apparatus 140 includes an actuating part 141, a linkage part 143, and an electric power tool 145.

The actuating part 141 is fixed to a center table 220 disposed between the front table 20 and the rear table 120.

The actuating part 141 is installed on the center table 220 through a supporting stand 221, and is configured to move in the up and down directions.

The linkage part 143 is connected to an end of the driving shaft of the actuating part 141.

In addition, the linkage part 143 is mounted on a rail 223 installed in the supporting stand 221, and is configured to move up and down along the rail 223.

One end of the linkage part 143 is connected to the driving shaft of the actuating part 141, and the other end is connected to the electric power tool 145.

The linkage part 143 includes three link points and two link arms, and thereby, is configured to move the electric power tool 145 in the front, rear, left, and right directions.

The electric power tool 145 is connected to an end of the linkage part 143 through a tool bracket 147.

The tool bracket 147 is formed with a slit groove 149 along the length direction on an upper surface.

A cam-nut runner 150 is mounted on one side of the slit groove 149 of the tool bracket 147, and a cam-bolt gripper 155 is mounted on the other side of the tool bracket 147.

At this time, the cam-bolt gripper 155 is fitted into the slit groove 149 so as to be slidable by a moving block 155a.

That is, the cam-nut runner 150 is fixedly mounted to the tool bracket 147, and the cam-bolt gripper 155 may slide along the slit groove 149 of the tool bracket 147, e.g., by an operation of a cylinder, by which the distance between the cam-bolt gripper 155 and the cam-nut runner 150 is adjusted.

Due to an adjustment of the distance between the cam-bolt gripper 155 and the cam-nut runner 150, the rear wheel adjustment apparatus 140 may become suitable for any type of vehicles that may have different distances between its cam-bolt and cam-nut.

A distance between the cam-nut runner 150 and the cam-bolt gripper 155 may be set in a range of 60 mm to 88 mm.

Therefore, the system for automatic wheel alignment adjustment according to an exemplary embodiment may be applied regardless of specific types of vehicles.

According to a system for automatic wheel alignment adjustment according to an exemplary embodiment, when a component apparatus malfunctions, e.g., when any of the front wheel adjustment apparatus 10, the rear wheel moving apparatus 100, and the rear wheel adjustment apparatus 140 malfunctions, the malfunctioning apparatus may be moved from the working space of alignment adjustment to a new space and may be serviced in the new space. Therefore, a correctly functioning apparatus may continue its alignment adjustment, and stoppage of a whole system due to malfunctioning of a partial apparatus may be prevented.

At this time, an operator can manually control the rear wheel adjustment apparatus 140, while holding a lower end of the electric power tool 145 in a state of being decoupled from the rear wheel moving apparatus 100.

According to a system for automatic wheel alignment adjustment according to an exemplary embodiment, two front wheels and two rear wheels may be separately adjusted, and thereby, when an apparatus for adjusting alignment for a specific wheel malfunctions, other apparatus for adjusting the remaining wheels may be continuously operated, thereby preventing delay of the wheel alignment adjustment.

For example, when one of the pair of front robots 30 of the front wheel adjustment apparatus 10 malfunctions, the other front robot 30 may adjust both front wheels, by which a stoppage of wheel alignment adjustment may be prevented.

In addition, according to a system for automatic wheel alignment adjustment according to an exemplary embodiment, the rear wheel moving apparatus 100 and the rear wheel adjustment apparatus 140 are separately arranged, and thereby, load for moving the rear wheel adjustment apparatus 140 may be reduced and a robot for moving the rear wheel adjustment apparatus 140 may be implemented as a small robot. This can reduce the overall size and cost.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A system for automatic wheel alignment adjustment of a vehicle in an inspection line, the system being disposed under a mounting table mounted with a vehicle, the system comprising:
    a front wheel adjustment apparatus disposed in correspondence with a front wheel of the vehicle and configured to adjust alignment of the front wheel by adjusting a tie-rod and a lock-nut employed in a linkage structure of the front wheel;
    a rear wheel moving apparatus disposed in correspondence with a rear wheel of the vehicle and slidable in a vehicle width direction; and
    a rear wheel adjustment apparatus disposed in correspondence with the rear wheel of the vehicle, connectable to the rear wheel moving apparatus, and configured to adjust alignment of the rear wheel by adjusting a cam-bolt and a cam-nut employed in a linkage structure of the rear wheel.

2. The system of claim 1, wherein the front wheel adjustment apparatus comprises:

a pair of front robots mounted on a front table fixed to the ground and slidable along a vehicle length direction through a plurality of rails formed on an upper surface of the front table;

a tie-rod gripper installed to the front robots and configured to adjust the tie-rod; and a lock-nut runner mounted to the front robots and configured to adjust the lock-nut.

3. The system of claim 2, wherein each of the pair of front robots comprises:

a front carriage mounted on the plurality of rails and slidable in a vehicle length direction;

a front moving part mounted on the front carriage, movable in the vehicle width direction along the front carriage, and configured to move in an up and down direction; and a front robot arm mounted at the front moving part.

4. The system of claim 2, wherein the tie-rod gripper comprises:

a body part mounted to an end of one of pair of front robots;

a pair of moving brackets installed at the body part and configured to reciprocally move to be closer or farther with respect to each other; and a pair of finger members fixedly installed at each of the moving brackets and formed with gripping grooves for gripping the tie-rod, at surfaces facing each other.

5. The system of claim 4, wherein the moving brackets are configured to be reciprocally movable.

6. The system of claim 4, wherein the pair of finger members is configured to reciprocally move with respect to each other according to movement of the pair of moving brackets to grip the tie-rod by the gripping grooves.

7. The system of claim 2, wherein the lock-nut runner is installed to the tie-rod gripper through a mounting bracket and is configured to be electrically operated.

8. The system of claim 2, wherein the lock-nut runner comprises a gripping part configured to grip the lock-nut, the gripping part being in line with a pair of finger members of the tie-rod gripper.

9. The system of claim 2, wherein the lock-nut runner is configured to be operable through wireless communication.

10. The system of claim 1, wherein the rear wheel moving apparatus comprises:

a pair of rear robots mounted on a rear table fixed to the ground and slidable along a vehicle width direction through a plurality of rails formed on an upper surface of the rear table; and a coupling part installed to the rear robots and attachable to and detachable from the rear wheel adjustment apparatus.

11. The system of claim 10, wherein each of the pair of rear robots comprises:

a rear carriage mounted on the plurality of rails and slidable in the vehicle width direction;

a rear moving part mounted on the rear carriage, movable in a vehicle length direction along the rear carriage, and configured to move in an up and down direction; and a rear robot arm mounted at the rear moving part.

12. The system of claim 11, wherein the rear moving part is configured to be movable in an up and down direction.

13. The system of claim 11, wherein the rear wheel adjustment apparatus is configured to be operated by the rear moving part and the rear robot arm.

14. The system of claim 10, wherein the coupling part is attachable to and detachable from an engagement pin of the rear wheel adjustment apparatus.

15. The system of claim 1, wherein the rear wheel adjustment apparatus comprises:

a pair of actuating parts fixed to a center table through a pair of supporting stands and movable in an up and down direction;

a linkage part connected to an end of a driving shaft of the pair of actuating parts; and an electric power tool connected to an end of the linkage part and including a cam-nut runner and a cam-bolt gripper configured to adjust the cam-nut and the cam-bolt, respectively, where a distance between the cam-nut runner and the cam-bolt gripper is adjustable.

16. The system of claim 15, wherein:

the electric power tool comprises a tool bracket connected to an end of the linkage part and formed with a slit groove along a length direction;

the cam-nut runner is installed at the slit groove; and the cam-bolt gripper is slidably fitted to the slit groove through a moving block.

17. The system of claim 16, wherein the distance between the cam-nut runner and the cam-bolt gripper of the electric power tool is in a range of 60 mm to 88 mm.

* * * * *